(12) United States Patent
Sharifi et al.

(10) Patent No.: US 9,087,124 B1
(45) Date of Patent: Jul. 21, 2015

(54) ADAPTIVE WEIGHTING OF POPULAR REFERENCE CONTENT IN AUDIO MATCHING

(75) Inventors: Matthew Sharifi, Zurich (CH);
Gheorghe Postelnicu, Zurich (CH);
Yaniv Bernstein, Parkville (AU);
Dominik Roblek, Mountain View, CA (US)

(73) Assignee: Google Inc., Mountain View, CA (US)

( * ) Notice: Subject to any disclaimer, the term of this patent is extended or adjusted under 35 U.S.C. 154(b) by 511 days.

(21) Appl. No.: 13/430,134

(22) Filed: Mar. 26, 2012

(51) Int. Cl.
*G10L 19/00* (2013.01)
*G06F 17/30* (2006.01)
*H04R 29/00* (2006.01)

(52) U.S. Cl.
CPC ............................... *G06F 17/30743* (2013.01)

(58) Field of Classification Search
CPC ............... G06F 17/30743; G06F 17/30758; G06F 17/30861; G06F 17/30749
USPC ....... 704/270, 500; 381/56; 700/94; 709/217; 380/252
See application file for complete search history.

(56) References Cited

U.S. PATENT DOCUMENTS

| | | | |
|---|---|---|---|
| 6,453,252 B1 | 9/2002 | Laroche | |
| 6,721,488 B1 | 4/2004 | Dimitrova et al. | |
| 7,516,074 B2 | 4/2009 | Bilobrov | |
| 7,809,580 B2 | 10/2010 | Hotho et al. | |
| 2002/0023020 A1 | 2/2002 | Kenyon et al. | |
| 2004/0210533 A1* | 10/2004 | Picker et al. | 705/51 |
| 2007/0055500 A1* | 3/2007 | Bilobrov | 704/217 |
| 2009/0012638 A1 | 1/2009 | Lou | |

OTHER PUBLICATIONS

MusicBrainz—The Open Music Encyclopedia, http://musicbrainz.org, Last accessed Apr. 12, 2012.
Shazam, http://www.shazam.com, Last accessed Apr. 19, 2012.
Media Hedge, "Digital Fingerprinting," White Paper, Civolution and Gracenote, 2010, http://www.civolution.com/fileadmin/bestanden/white%20papers/Fingerprinting%20-%20br/020Civolution%20and%20Gracenote%20-%202010.pdf, Last accessed Jul. 11, 2012.
Milano, Dominic, "Content Control: Digital Watermarking and Fingerprinting," White Paper, Rhozet, a business unit of Harmonic Inc., http://www.rhozet.com/whitepapers/Fingerprinting_Watermarking.pdf, Last accessed Jul. 11, 2012.

* cited by examiner

*Primary Examiner* — Vivian Chin
*Assistant Examiner* — Ammar Hamid
(74) *Attorney, Agent, or Firm* — Amin, Turocy & Watson, LLP (57) ABSTRACT

Systems and methods are provided herein relating to audio matching. Adaptive weighting of popular reference content can be used to more efficiently allocate space in a weighted reference index used to match audio signals. An audio reference index can be maintained that contains a set of audio references wherein each audio reference in the set of audio references is associated with a score. A weighted reference index can be generated based on the audio reference index and the score associated with each audio reference wherein respective audio references are up-weighted or up-scored based at least in part of user popularity. The benefits in using adaptive weighting of popular reference content can improve the accuracy of an audio matching system.

28 Claims, 9 Drawing Sheets

ADAPTIVE WEIGHTING OF POPULAR REFERENCE CONTENT IN AUDIO MATCHING

TECHNICAL FIELD

This application relates to audio matching, and more particularly to adaptive weighting of popular reference content.

BACKGROUND

Audio samples can be recorded by many commercially available electronic devices such as smart phones, tablets, e-readers, computers, personal digital assistants, personal media players, etc. Audio matching provides for identification of a recorded audio sample by comparing the audio sample to a set of reference samples. To make the comparison, an audio sample can be transformed to a time-frequency representation of the sample by using, for example, a short time Fourier transform (STFT). Using the time-frequency representation, interest points that characterize time and frequency locations of peaks or other distinct patterns of the spectrogram can then be extracted from the audio sample. Descriptors can be computed as functions of sets of interest points. Descriptors of the audio sample can then be compared to descriptors of reference samples to determine the identity of the audio sample.

When comparing the descriptor of an audio sample to descriptors of reference samples, it is desirable to have a database containing enough reference samples to make the comparison. The audio sample could come from any of a large number of sources, and be of any of a variety of content types (e.g., from music, from a movie, or from a television show). Consequently, a database of reference samples that contains sufficient music samples, movie samples, and television samples to afford for accurate matching could contain millions of samples.

Thousands of interest points can be generated for a reference sample. Reference descriptors can be computed as functions of sets of interest points. In general, reference descriptors do not contain the entire set of interest points generated for a reference sample. Varying amounts of interest points, depending on the characteristics of a reference sample, can be generated for each reference sample. Reference descriptors, in general, contain a constant number of interest points in each descriptor. Thus, every interest point generated for a reference sample will likely not be in a single descriptor associated with the reference sample; instead, only a subset of generated interest points will be included in each descriptor. In general, reference samples in a reference database can have multiple descriptors associated with the reference sample, where the multiple descriptors are different subsets of interest points generated from the reference sample. The more descriptors generated and stored in a reference database for each reference sample, the larger the reference database can become. In addition, an audio matching system that is robust to distortion is also desirable. Therefore, there exists a need to effectively allocate space amongst a large database of a plurality of reference sample descriptors while also being robust to distortions.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

Systems and methods disclosed herein relate to audio matching. An index component can maintain an audio reference index containing a set of audio references wherein each audio reference in the set of audio references is associated with a set of descriptors and each descriptor in the set of descriptors contains a set of interest points. A scoring component can maintain a score associated with each audio reference in the set of audio references. A weighting component can generate a weighted reference index based on the set of audio references, the set of descriptors associated with each audio reference in the set of audio references, and the score associated with each audio reference in the set of audio references, wherein respective audio references are up-weighted or down-weighted based at least in part of user popularity.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

Audio matching in general involves analyzing an audio sample for unique characteristics that can be used in comparison to unique characteristics of reference samples to identify the audio sample. One manner to identify unique characteristics of an audio sample is through use of a spectrogram. A spectrogram represents an audio sample by plotting time on one axis and frequency on another axis. Additionally, amplitude or intensity of a certain frequency at a certain time can also be incorporated into the spectrogram by using color or a third dimension.

There are several different techniques for creating a spectrogram. One technique involves using a series of band-pass filters that can filter an audio sample at a specific frequency and measure amplitude of the audio sample at that specific frequency over time. The audio sample can be run through additional filters to individually isolate a set of frequencies to measure the amplitude of the set over time. A spectrogram can be created by combining all the measurements over time on the frequency axis to generate a spectrogram image of frequency amplitudes over time.

A second technique involves using short-time Fourier transform ("STFT") to break down an audio sample into time windows, where each window is Fourier transformed to calculate a magnitude of the frequency spectrum for the duration of each window. Combining a plurality of windows side by side on the time axis of the spectrogram creates an image of frequency amplitudes over time. Other techniques, such as wavelet transforms, can also be used to construct a spectrogram.

Creating and storing in a database an entire spectrogram for a plurality of reference samples can require large amounts of storage space and affect scalability of an audio matching system. Therefore, it is desirable to instead calculate and store compact descriptors ("fingerprints") of reference samples versus an entire spectrogram. One method of calculating descriptors is to first determine individual interest points that identify unique characteristics of local features of the time-frequency representation of the reference sample. Descriptors can then be computed as functions of sets of interest points.

Calculating interest points involves identifying unique characteristics of the spectrogram. For example, an interest point could be a spectral peak of a specific frequency over a specific window of time. As another non-limiting example, an interest point could also include timing of the onset of a note. It is to be appreciated that conceivably any suitable spectral event over a specific duration of time could constitute an interest point. It can be further appreciated that thousands of interest points can be generated for a reference sample. In general, reference descriptors do not contain the entire set of interest points generated for a reference sample. Varying amounts of interest points, depending on the characteristics of a reference sample, can be generated for each reference sample. Reference descriptors can contain a constant number of interest points in each descriptor. Thus, every interest point generated for a reference sample will likely not be in a single descriptor associated with the reference sample; instead, only a subset of generated interest points will be included in each descriptor. In general, reference samples in a reference database can have multiple descriptors associated with the reference sample, where the multiple descriptors are different subsets of interest points generated from the reference sample.

An audio matching system that includes multiple reference descriptors with differing subsets of interest points for each reference sample is generally more accurate in identifying an audio sample than an audio matching system with a single descriptor for each reference sample. For example, the more reference sample descriptors stored for a individual reference sample, the more subsets of interest points for the reference sample will be able to be matched against. The more potential matching interest points available to be matched against, the more likely an interest point from a descriptor of an audio sample will match an interest point from one of the reference sample descriptors. This can also be true for distorted samples where some interest points in a distorted audio sample may relate to distortions rather than the underlying content that is desired to be matched. Having more descriptors relating to a reference descriptor can therefore increase the chance that some of the clean interest points in a distorted audio sample descriptor will match an interest point in one of the reference sample descriptors. However, adding additional descriptors containing differing subsets of interest points for each reference sample can limit scalability of the system, as it can take additional memory to store additional descriptors.

While adding additional descriptors for each reference sample in a reference database can limit scalability, adding additional descriptors associated with popular reference samples can provide the benefit of improving accuracy in regards to identifying popular reference sample content. The amount of descriptors retained for reference samples that are not popular can be less than the amount of descriptors retained for popular reference samples. This can provide for more accurate identification of popular reference content included distorted samples of popular reference content.

Systems and methods herein provide for adaptive weighting of popular reference content. An audio reference index containing a set of audio references can be maintained wherein each audio reference in the set of audio references is associated with a set of descriptors. A score associated with each audio reference in the set of audio references can be maintained. A weighted reference index can be generated based on the set of audio references, the set of descriptors associated with each audio reference in the set of audio references, and the score associated with each audio reference in the set of audio references, wherein respective audio references are up-weighted or up-scored based at least in part on user popularity. In one implementation, the weighted reference index can be generated based on the set of audio references, the set of descriptors associated with each audio reference in the set of audio references, and the score associated with each audio reference in the set of audio references, wherein respective audio references can be down-weighted or down-scored based at least in part on user popularity.

As discussed in greater detail below, various implementations provide for running a batch set of audio signal excerpts associated with user submitted audio matching queries. For example, the batch can be set as a time period, such as the week prior to running the batch or a historical period in the past. Each audio signal excerpt within the set of audio signal excerpts can be matched to an audio reference among the set of audio references based on the set of descriptors associated with the audio reference wherein the score associated with the audio reference can be adjusted based on each match. Thus, actual user queries can help establish which reference content is more popular than other reference content.

Figure 1:
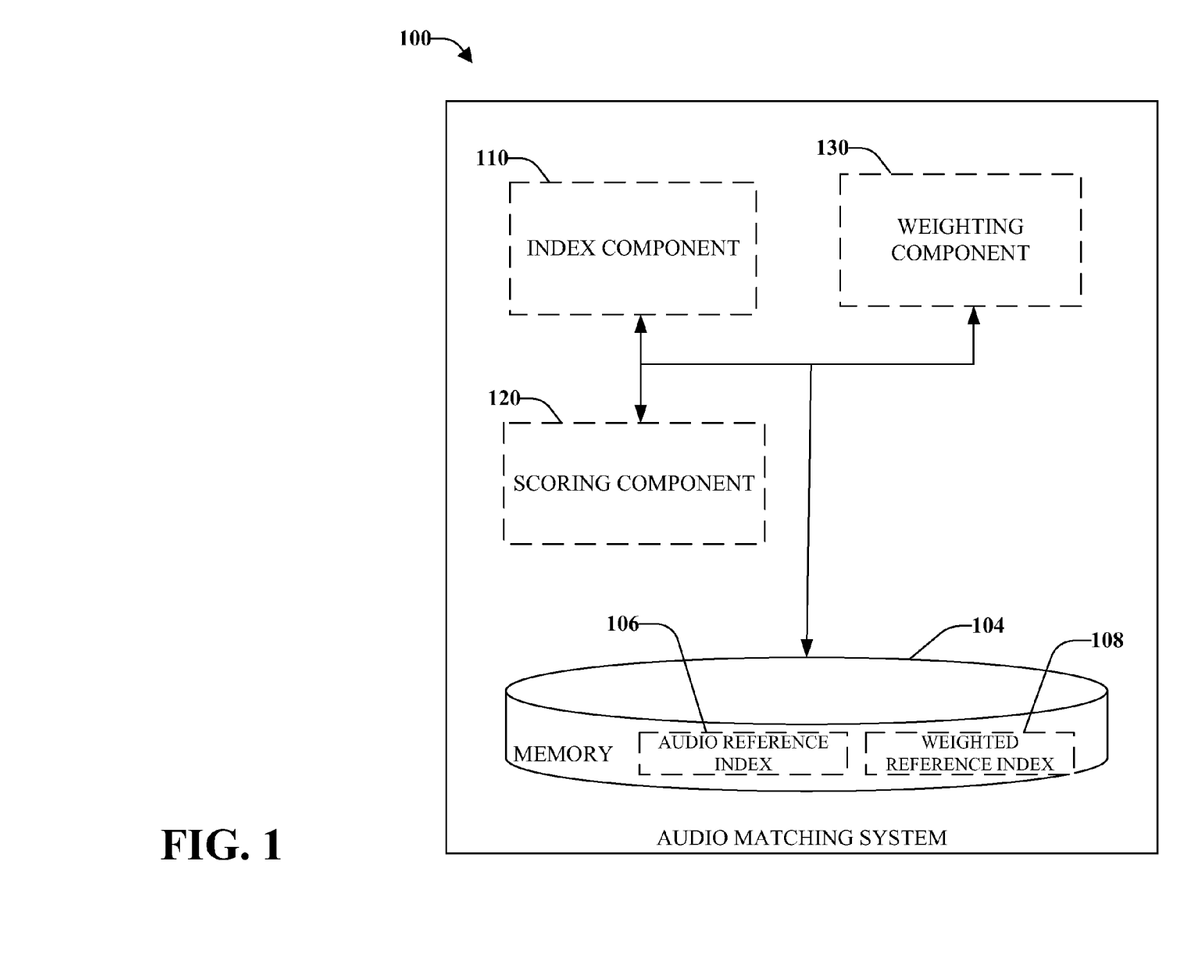
FIG. 1 illustrates a high-level functional block diagram of an example audio matching system using adaptive weighting of popular reference content in accordance with implementations of this disclosure.

Referring to FIG. 1, there is illustrated a high-level functional block diagram of an example audio matching system using adaptive weighting of popular reference content in accordance with implementations of this disclosure. An index component 110 can maintain an audio reference index 106 containing a set of audio references wherein each audio reference in the set of audio references is associated with a set of descriptors and each descriptor in the set of descriptors contains a set of interest points. Audio reference index 106 can be stored in memory 104.

A scoring component 120 can maintain a score associated with each audio reference in the set of audio references. A score can be associated with the popularity of an individual reference. For example, a higher score could indicate the reference is more popular than one with a lower score. An inference could be that users of a audio matching system may more frequently attempt to identify popular content versus unpopular content. In one implementation, scoring component 120 can determine the score associated with each audio reference based on at least one of a ranked list of popular recordings, a sales chart of popular songs, a sales chart of popular albums, a ranked list of most frequently played tracks on a radio station, or a ranked list of most frequently played tracks on a set of radio stations. It can be appreciated that other measurements of popularity including audio content associated with television and movies can be incorporated into the score. For example, popular content identified by a sales chart could have their score increased.

A weighting component 130 can generate a weighted reference index 108 based on the set of audio references, the set of descriptors associated with each audio reference in the set of audio references, and the score associated with each audio reference in the set of audio references, wherein respective audio references are up-weighted or down weighted based at least in part of user popularity. Weighted reference index 108 can be stored in memory 104.

In one implementation, weighting component 130 can generate the weighted reference index by adjusting a number of descriptors in a set of descriptors associated with audio references in the weighted reference index based on the score associated with respective audio references. For example, a reference with a score indicative of high popularity could be up-weighted by generating additional descriptors associated with the reference, generating more interest points allowing for more subsets of interest points to be available for potential descriptors associated with the reference, or both. In another example, a reference with a score indicative of low popularity could a lower number of descriptors in its associated set of descriptors, as compared to a more popular reference. It can be appreciated that a threshold floor can be established that sets a minimum amount of descriptors associated with reference samples. Thus, popular references can be allocated more space in memory as popular references can have additional descriptors. In one implementation, references associated with popular queries are weighted higher in a reference database than references that are not identified in popular queries. In another implementation, popular queries are determined based at least in part on frequency of matched songs.

In one implementation, audio reference index 106 is not weighted. It can be appreciated that in using a non-weighted audio reference index, previous weighting will not affect associated scoring. For example, as discussed above and in greater detail in regards to FIG. 4, highly scored or popular references can be assigned more descriptors. By using a weighted reference index to adjust scoring, the scoring could be impacted by those up-weighted references containing additional descriptors as compared to lower weighted references with less descriptors.

Figure 2:
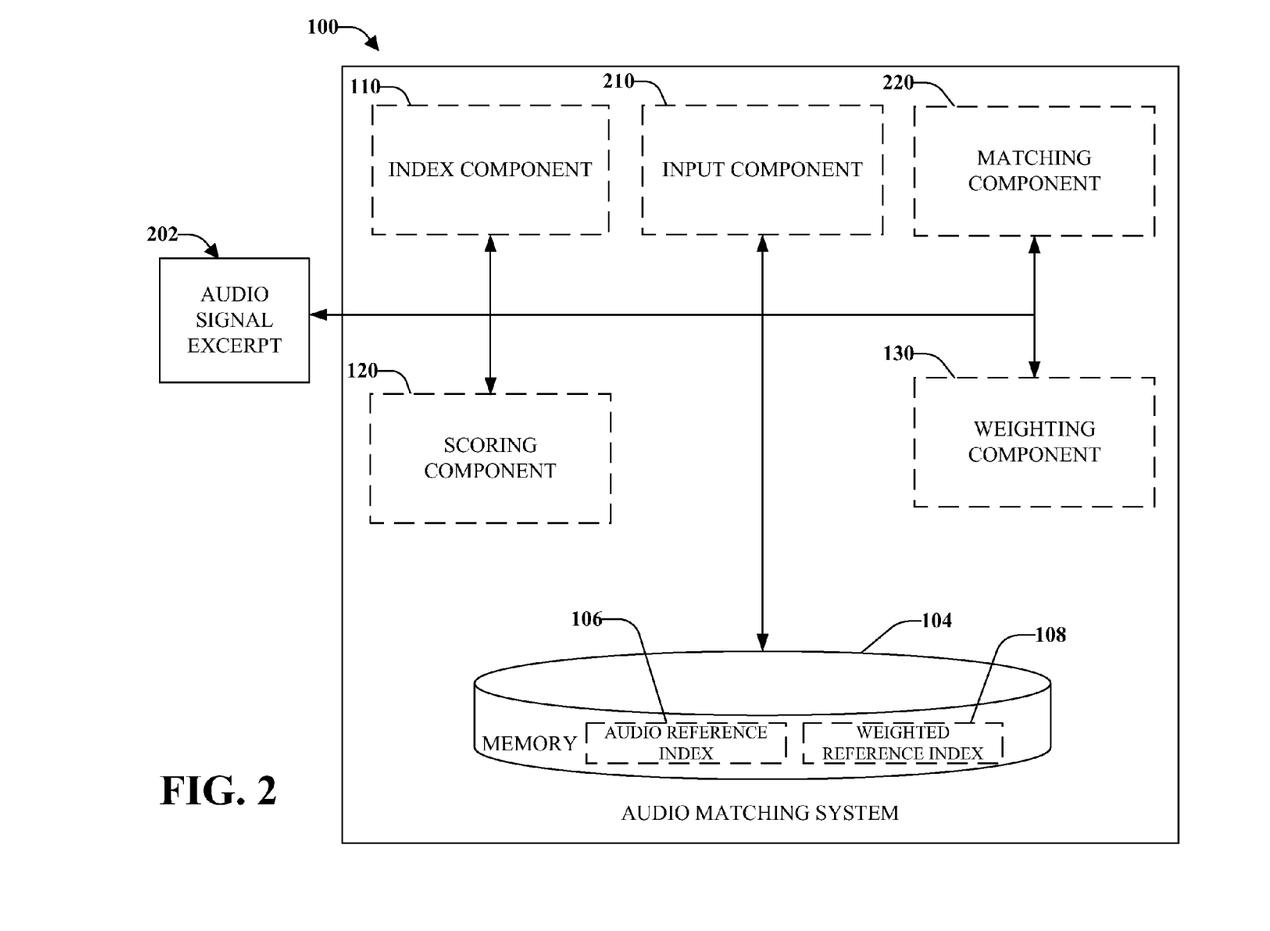
FIG. 2 illustrates a high-level functional block diagram of an example audio matching system using adaptive weighting of popular reference content including an input component and a matching component in accordance with implementations of this disclosure.

Referring to FIG. 2, there is illustrated a high-level functional block diagram of an example audio matching system using adaptive weighting of popular reference content including an input component 210 and a matching component 220 in accordance with implementations of this disclosure. An input component can receive an audio signal excerpt 202. A matching component can match the audio signal excerpt to an audio reference among the set of audio references based on the set of descriptors associated with the audio reference wherein the scoring component increases the score associated with the audio reference based on the match. It can be appreciated that each audio signal excerpt 202 received by input component 210 can adjust the score of a matching audio reference in the set of audio references stored in audio reference index 106.

Figure 3:
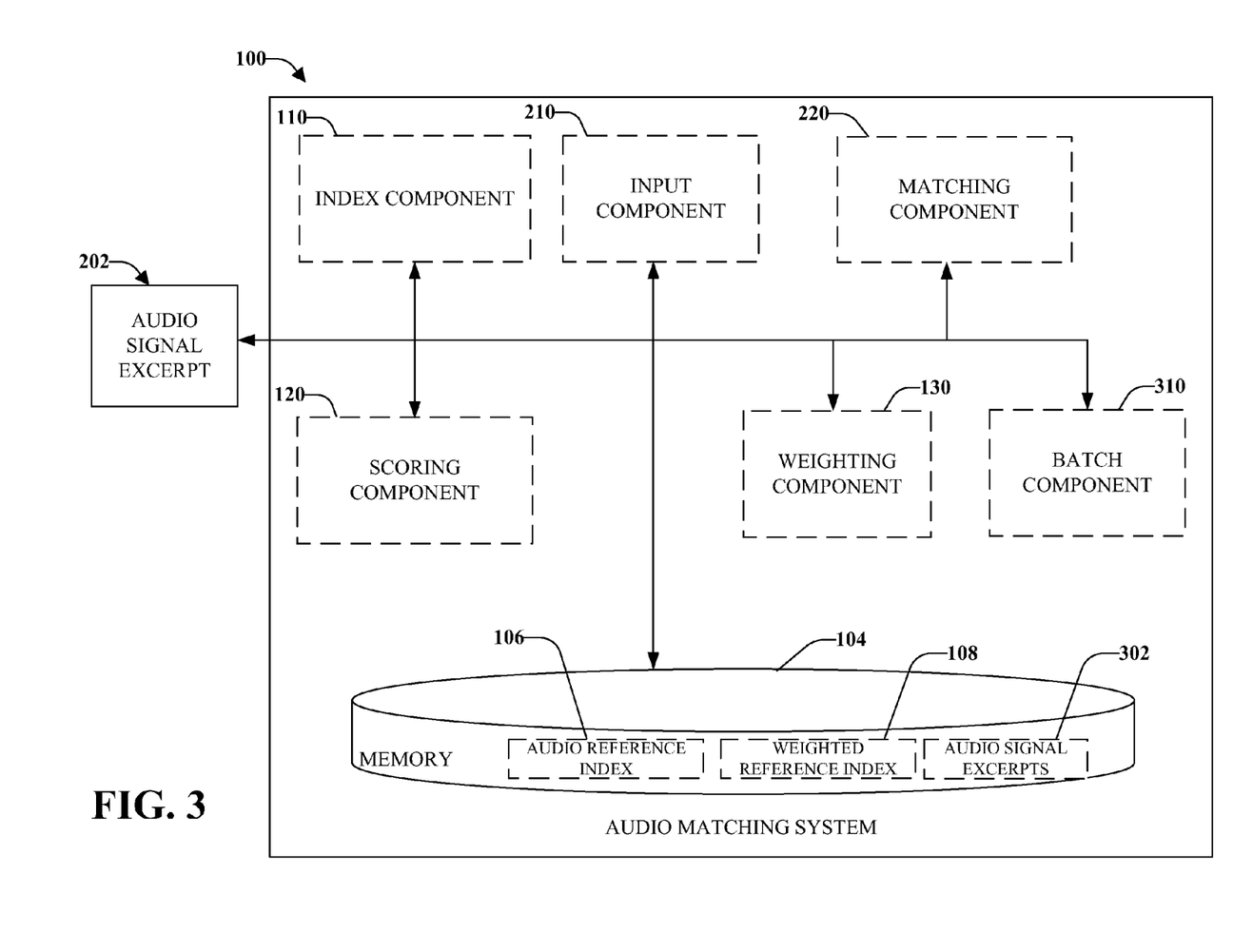
FIG. 3 illustrates a high-level functional block diagram of an example audio matching system using adaptive weighting of popular reference content including a batch component in accordance with implementations of this disclosure.

Referring to FIG. 3, there is illustrated a high-level functional block diagram of an example audio matching system using adaptive weighting of popular reference content including batch component 310 that can send a set of audio signal excerpts 302 to the input component. In one implementation, scoring component 120 can reset the score associated with each audio reference in the set of audio references prior to or contemporaneously with the batch component sending the set of audio signal excerpts to the input component.

For example, the set of audio signal excerpts 302 can be queries made by users of an audio matching system over a period of time. In one implementation, the batch can process all queries made in the last week. It can be appreciated that the batch process could be rerun every day. For example, scoring component 120 can reset the score associated with each reference, and a batch could be run that effectively re scores audio reference index 106 each day based on a predetermined unit of time.

Figure 4:
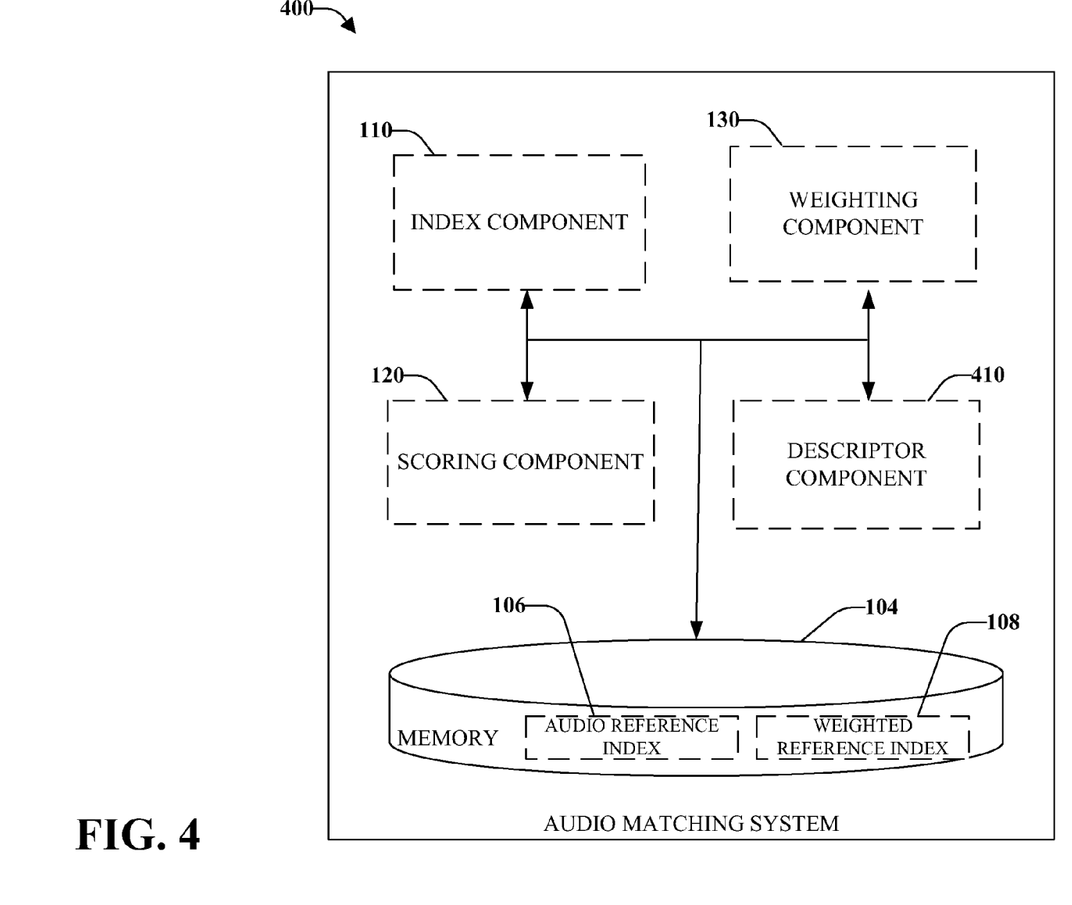
FIG. 4 illustrates a high-level functional block diagram of an example audio matching system using adaptive weighting of popular reference content including a descriptor component in accordance with implementations of this disclosure.

Referring to FIG. 4, there is illustrated a high-level functional block diagram of an example audio matching system using adaptive weighting of popular reference content including a descriptor component 410 that can generate at least one interest point associated with an audio reference in the weighted index. Weighting component 130 can further replace interest points in a set of interest points in a descriptor among the set of descriptors associated with the audio reference in the weighted reference index with the at least one interest point. In one implementation, descriptor component 410 can further generate at least one additional descriptor of the audio reference, wherein the at least one additional descriptor contains the at least one interest point. In one implementation, weighting component 130 can adjust the number of descriptors in the set of descriptors associated with the audio reference by associating the at least one additional descriptor of the audio reference with the audio reference. In another implementation, weighting component 130 can adjust the number of descriptors in the set of descriptors by removing at least one descriptor from the set of descriptors associated with the audio reference.

For example, if a score associated with an audio reference is high additional descriptors can be generated for the reference and associated with the reference. Additional interest points can be generated for the reference and replace interest points within an existing descriptor associated with the reference or be included within a newly generated descriptor. In one implementation, additional descriptors can be generated from existing interest points, e.g., using more subsets of existing interest points. In one implementation, the amount of interest points in each descriptor can remain constant.

Figure 5:
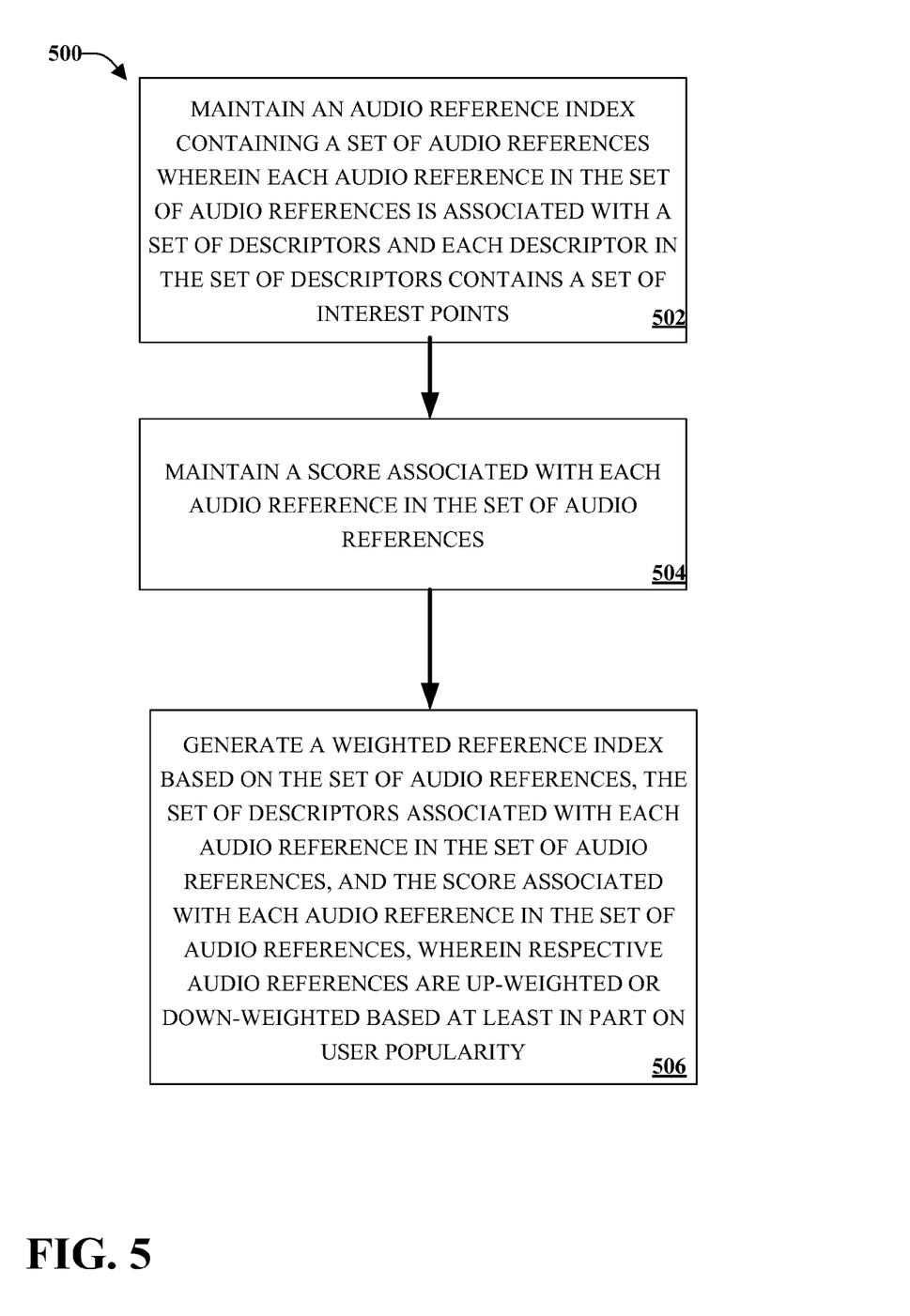
FIG. 5 illustrates an example method for adaptive weighting of popular reference content in accordance with implementations of this disclosure.
Figure 6:
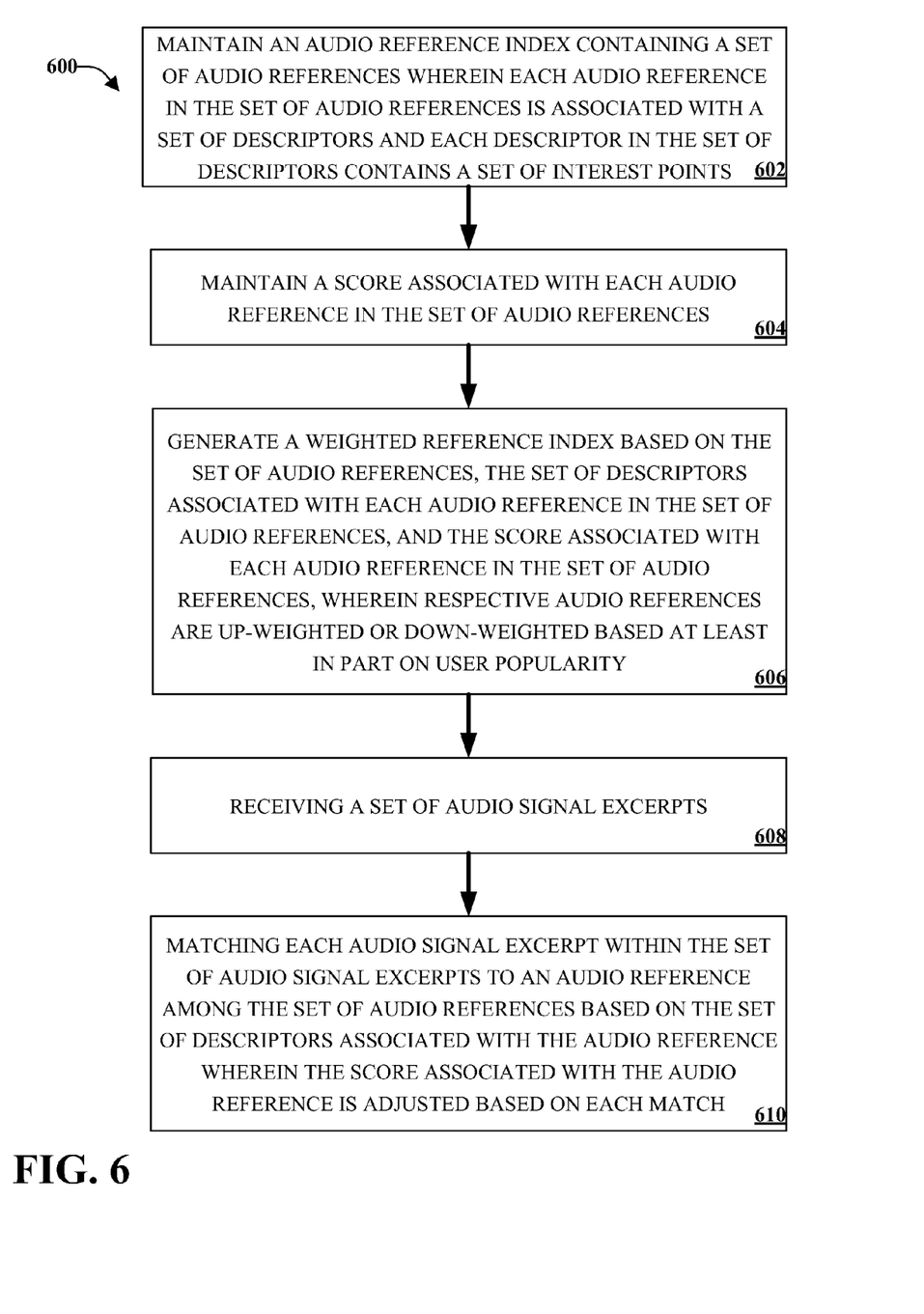
FIG. 6 illustrates an example method for adaptive weighting of popular reference content based on a received set of audio signal excerpts in accordance with implementations of this disclosure.
Figure 7:
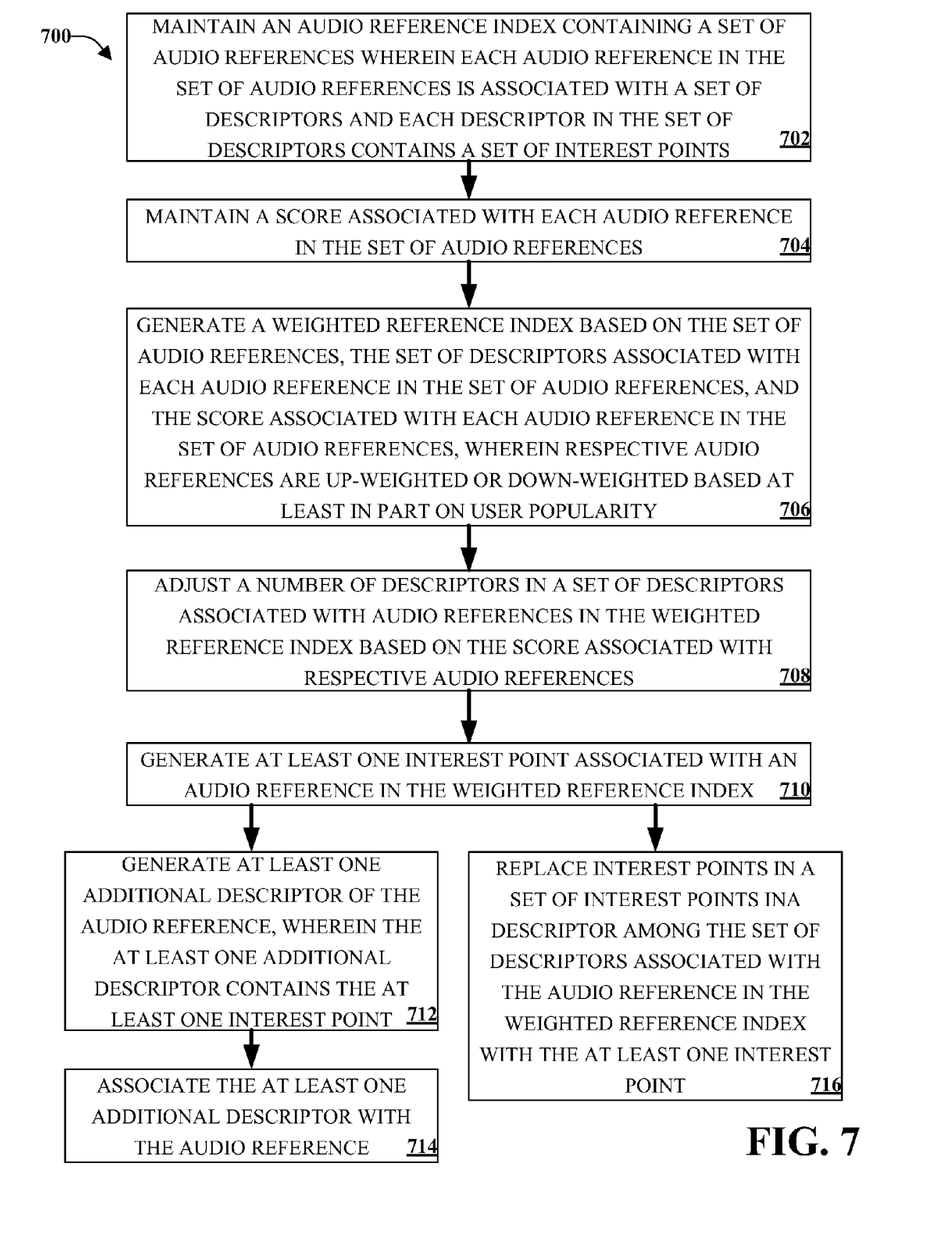
FIG. 7 illustrates an example method for adaptive weighting of popular reference content including adjusting descriptors in accordance with implementations of this disclosure.

FIGS. 5-7 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with the following methods.

FIG. 5 illustrates an example method for adaptive weighting of popular reference content in accordance with implementations of this disclosure. At 502, an audio reference index containing a set of audio references can be maintained (e.g., by an index component) wherein each audio reference in the set of audio references is associated with a set of descriptors and each descriptor in the set of descriptors contains a set of interest points. At 504, a score associated with each audio reference in the set of audio references can be maintained (e.g., by a scoring component). At 506, a weighted reference index can be generated (e.g., by a weighting component) based on the set of audio references, the set of descriptors associated with each audio reference in the set of audio references, and the score associated with each audio reference in the set of audio references, wherein respective audio references are up-weighted or down-weighted based at least in part on user popularity FIG. 6 illustrates an example method for adaptive weighting of popular reference content based on a received set of audio signal excerpts in accordance with implementations of this disclosure. At 602, an audio reference index containing a set of audio references can be maintained (e.g., by an index component) wherein each audio reference in the set of audio references is associated with a set of descriptors and each descriptor in the set of descriptors contains a set of interest points. At 604, a score associated with each audio reference in the set of audio references can be maintained (e.g., by a scoring component). At 606, a weighted reference index can be generated (e.g., by a weighting component) based on the set of audio references, the set of descriptors associated with each audio reference in the set of audio references, and the score associated with each audio reference in the set of audio references, wherein respective audio references are up-weighted or down-weighted based at least in part on user popularity.

At 608, a set of audio signal excerpts can be received (e.g., by an input component). At 610, each audio signal excerpt within the set of audio signal excerpts can be matched (e.g., by a matching component) to an audio reference among the set of audio references based on the set of descriptors associated with the audio reference wherein the score associated with the audio reference is adjusted based on each match.

FIG. 7 illustrates an example method for adaptive weighting of popular reference content including adjusting descriptors in accordance with implementations of this disclosure. At 702, an audio reference index containing a set of audio references can be maintained (e.g., by an index component) wherein each audio reference in the set of audio references is associated with a set of descriptors and each descriptor in the set of descriptors contains a set of interest points. At 704, a score associated with each audio reference in the set of audio references can be maintained (e.g., by a scoring component). At 706, a weighted reference index can be generated (e.g., by a weighting component) based on the set of audio references, the set of descriptors associated with each audio reference in the set of audio references, and the score associated with each audio reference in the set of audio references, wherein respective audio references are up-weighted or down-weighted based at least in part on user popularity.

At 708, a number of descriptors in the set of descriptors associated with each audio reference in the weighted reference index can be adjusted (e.g., by a weighting component) based on the score associated with each audio reference. At 710, at least one interest point associated with an audio reference in the weighted reference index can be generated (e.g., by a descriptor component). At 712, at least one additional descriptor of the audio reference can be generated (e.g., by a descriptor component), wherein the at least one additional descriptor contains the at least one interest point. At 714, the at least one additional descriptor can be associated (e.g., by a weighting component) with the audio reference.

Alternatively to or concurrently with steps 712-714, at 716, interest points in a set of interest points in a descriptor among the set of descriptors associated with the audio reference in the weighted reference index can be replaced (e.g., by a weighting component) with the at least one interest point.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g. generating interest points and/or descriptors); software on a computer readable medium; or a combination thereof.

The aforementioned systems, circuits, modules, and so on have been described with respect to interaction between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Figure 8:
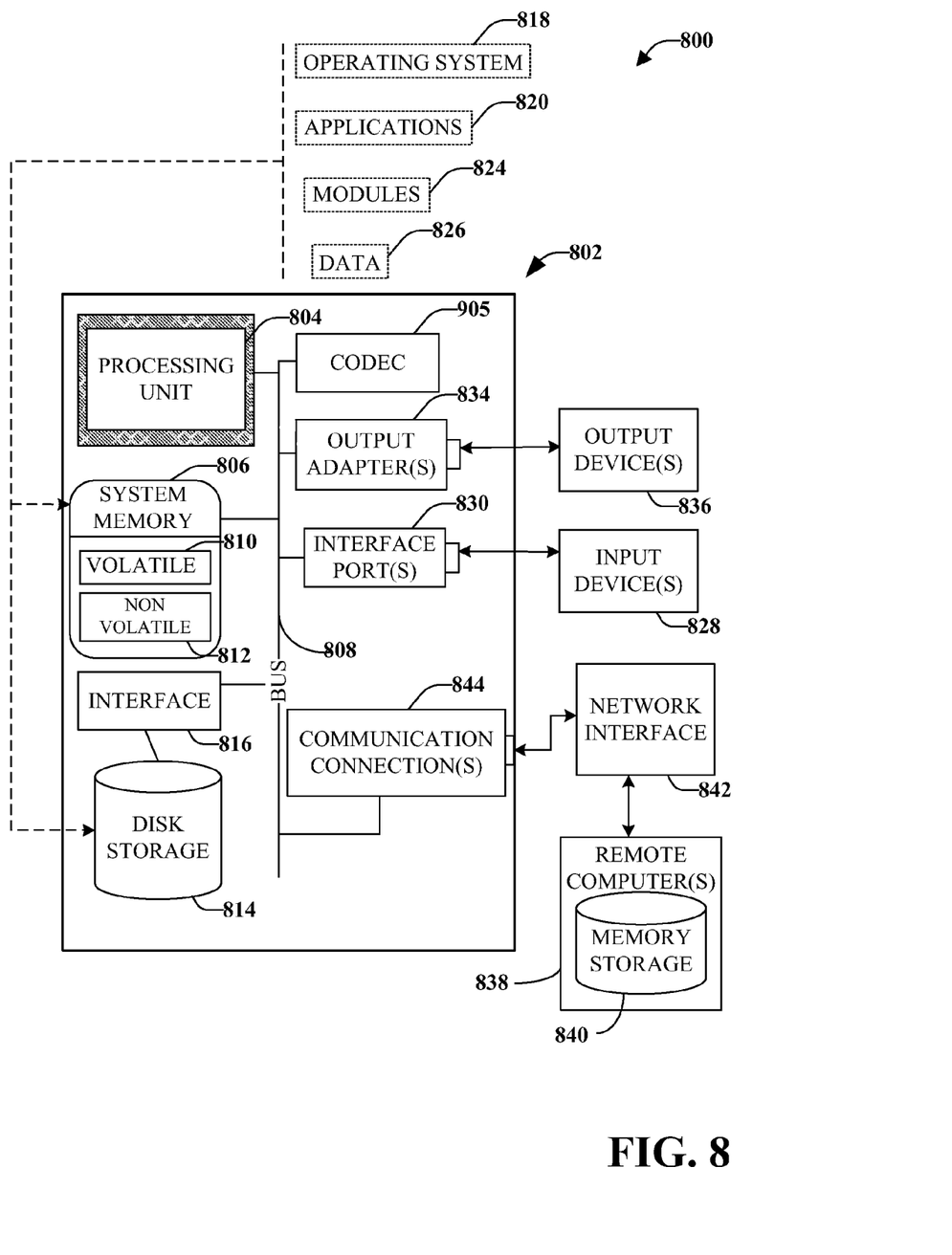
FIG. 8 illustrates an example block diagram of a computer operable to execute the disclosed architecture in accordance with implementations of this disclosure.

With reference to FIG. 8, a suitable environment 800 for implementing various aspects of the claimed subject matter includes a computer 802. The computer 802 includes a processing unit 804, a system memory 806, a codec 805, and a system bus 808. The system bus 808 couples system components including, but not limited to, the system memory 806 to the processing unit 804. The processing unit 804 can be any of various available processors. Dual microprocessors and other multiprocessor architectures also can be employed as the processing unit 804.

The system bus 808 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 806 includes volatile memory 810 and non-volatile memory 812. The basic input/output system (BIOS), containing the basic routines to transfer information between elements within the computer 802, such as during start-up, is stored in non-volatile memory 812. By way of illustration, and not limitation, non-volatile memory 812 can include read only memory (ROM), programmable ROM (PROM), electrically programmable ROM (EPROM), electrically erasable programmable ROM (EEPROM), or flash memory. Volatile memory 810 includes random access memory (RAM), which acts as external cache memory. According to present aspects, the volatile memory may store the write operation retry logic (not shown in FIG. 8) and the like. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ES-DRAM).

Computer 802 may also include removable/non-removable, volatile/non-volatile computer storage media. FIG. 8 illustrates, for example, a disk storage 814. Disk storage 814 includes, but is not limited to, devices like a magnetic disk drive, solid state disk (SSD) floppy disk drive, tape drive, Jaz drive, Zip drive, LS-100 drive, flash memory card, or memory stick. In addition, disk storage 814 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 814 to the system bus 808, a removable or non-removable interface is typically used, such as interface 816.

It is to be appreciated that FIG. 8 describes software that acts as an intermediary between users and the basic computer resources described in the suitable operating environment 800. Such software includes an operating system 818. Operating system 818, which can be stored on disk storage 814, acts to control and allocate resources of the computer system 802. Applications 820 take advantage of the management of resources by operating system 818 through program modules 824, and program data 826, such as the boot/shutdown transaction table and the like, stored either in system memory 806 or on disk storage 814. It is to be appreciated that the claimed subject matter can be implemented with various operating systems or combinations of operating systems.

A user enters commands or information into the computer 802 through input device(s) 828. Input devices 828 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 804 through the system bus 808 via interface port(s) 830. Interface port(s) 830 include, for example, a serial port, a parallel port, a game port, and a universal serial bus (USB). Output device(s) 836 use some of the same type of ports as input device(s) 828. Thus, for example, a USB port may be used to provide input to computer 802, and to output information from computer 802 to an output device 836. Output adapter 834 is provided to illustrate that there are some output devices 836 like monitors, speakers, and printers, among other output devices 836, which require special adapters. The output adapters 834 include, by way of illustration and not limitation, video and sound cards that provide a means of connection between the output device 836 and the system bus 808. It should be noted that other devices and/or systems of devices provide both input and output capabilities such as remote computer(s) 838.

Computer 802 can operate in a networked environment using logical connections to one or more remote computers, such as remote computer(s) 838. The remote computer(s) 838 can be a personal computer, a server, a router, a network PC, a workstation, a microprocessor based appliance, a peer device, a smart phone, a tablet, or other network node, and typically includes many of the elements described relative to computer 802. For purposes of brevity, only a memory storage device 840 is illustrated with remote computer(s) 838. Remote computer(s) 838 is logically connected to computer 802 through a network interface 842 and then connected via communication connection(s) 844. Network interface 842 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 844 refers to the hardware/software employed to connect the network interface 842 to the bus 808. While communication connection 844 is shown for illustrative clarity inside computer 802, it can also be external to computer 802. The hardware/software necessary for connection to the network interface 842 includes, for exemplary purposes only, internal and external technologies such as, modems including regular telephone grade modems, cable modems and DSL modems, ISDN adapters, and wired and wireless Ethernet cards, hubs, and routers.

Figure 9:
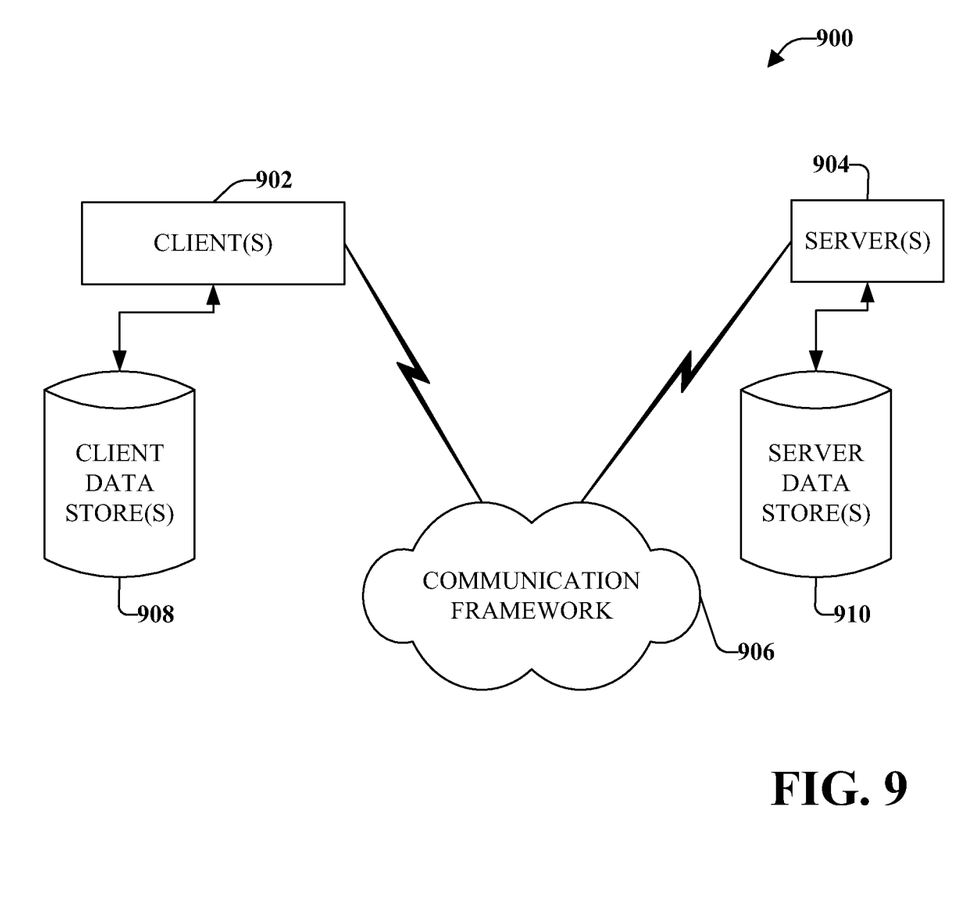
FIG. 9 illustrates an example schematic block diagram for a computing environment in accordance with implementations of this disclosure.

Referring now to FIG. 9, there is illustrated a schematic block diagram of a computing environment 900 in accordance with the subject specification. The system 900 includes one or more client(s) 902, which can include an application or a system that accesses a service on the server 904. The client(s) 902 can be hardware and/or software (e.g., threads, processes, computing devices). The client(s) 902 can house cookie(s), metadata, and/or associated contextual information by employing the specification, for example.

The system 900 also includes one or more server(s) 904. The server(s) 904 can also be hardware or hardware in combination with software (e.g., threads, processes, computing devices). The servers 904 can house threads to perform, for example, maintaining an audio reference index, maintaining a score, generating a weighted reference index, receiving an audio signal excerpt, matching an audio signal, etc. in accordance with the subject disclosure. One possible communication between a client 902 and a server 904 can be in the form of a data packet adapted to be transmitted between two or more computer processes where the data packet contains, for example, an audio sample or descriptors associated with an audio sample. The data packet can include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

The illustrated aspects of the disclosure may also be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present invention. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A system comprising:
    a memory that has stored thereon computer executable components; and
    a processor that executes the following computer executable components stored in the memory:
        an index component that maintains an audio reference index containing a set of audio references, wherein one or more audio references in the set of audio references is associated with a set of descriptors, and wherein one or more descriptors in the set of descriptors contains a set of interest points;
        a scoring component that maintains a score associated with the one or more audio references in the set of audio references; and
        a weighting component that:
    generates a weighted reference index based on the set of audio references, wherein the set of descriptors is associated with the one or more audio references in the set of audio references, wherein the score is associated with the one or more audio references in the set of audio references, wherein respective ones of the one or more audio references in the weighted reference index are up-weighted or down weighted based at least in part on user popularity; and
    generates the weighted reference index by adjusting a number of one or more descriptors in a set of descriptors associated with the one or more audio references in the weighted reference index based on the score associated with respective one or more audio references, and allocate an amount of space in memory to store the one or more audio references based on the determination of the weighted reference index.

2. The system of claim 1, wherein the scoring component also determines the score associated with the one or more audio references based at least in part on at least one of a ranked list of popular recordings, a sales chart of popular songs, a sales chart of popular albums, a ranked list of most frequently played tracks on a radio station, or a ranked list of most frequently played tracks on a set of radio stations.

3. The system of claim 1, further comprising:
an input component that receives an audio signal excerpt; and
a matching component that matches the audio signal excerpt to at least one of the one or more audio references among the set of audio references based on the set of descriptors associated with the at least one of the one or more audio references,
wherein the scoring component is further configured to increase the score associated with the at least one of the one or more audio references based on the match by the matching component.

4. The system of claim 3, further comprising a batch component that sends a set of audio signal excerpts to the input component.

5. The system of claim 4, wherein the scoring component also resets the score associated with the one or more audio references in the set of audio references prior to or contemporaneously with the batch component sending the set of audio signal excerpts to the input component.

6. The system of claim 4, wherein the set of audio signal excerpts is based on a set of audio signal queries.

7. The system of claim 4, wherein the set of audio signal queries is based on a period of time.

8. The system of claim 1, further comprising:
a descriptor component that generates at least one interest point associated with at least one of the one or more audio references in the weighted index.

9. The system of claim 8, wherein the weighting component further replaces interest points in the set of interest points in a descriptor among the set of descriptors associated with the one or more audio references in the weighted reference index with the at least one interest point.

10. The system of claim 8, wherein the descriptor component further generates at least one additional descriptor of the one or more audio references, wherein the at least one additional descriptor contains the at least one interest point.

11. The system of claim 10, wherein the weighting component also adjusts the number of the one or more descriptors in the set of descriptors associated with the one or more audio references by associating the at least one additional descriptor of the one or more audio references with one or more audio references.

12. The system of claim 1, wherein popular queries are weighted higher than unpopular queries in a reference database.

13. The system of claim 12, wherein the popular queries are determined based at least in part on frequency of matched songs.

14. The system of claim 12, wherein space allocation in the memory for respective queries is based in part on popularity of respective queries.

15. A method, comprising:
using a processor to execute computer executable components stored on a computer readable medium to perform acts comprising:
maintaining an audio reference index containing a set of audio references, wherein one or more of the audio references in the set of audio references is associated with a set of descriptors, and wherein one or more descriptors in the set of descriptors contains a set of interest points;
maintaining a score associated with the one or more audio references in the set of audio references; and
generating a weighted reference index based on the set of audio references, wherein the set of descriptors is associated with the one or more audio references in the set of audio references, wherein the score is associated with the one or more audio references in the set of audio references, wherein respective ones of the one or more audio references in the weighted reference index are up-weighted or down-weighted based at least in part on user popularity, and
wherein the generating the weighted reference index is also performed by adjusting a number of the one or more descriptors in the set of descriptors associated with the one or more audio references in the weighted reference index based on the score associated with the respective ones of the one or more audio references, and allocate an amount of space in memory to store the one or more audio references based on the determination of the weighted reference index.

16. The method of claim 15, wherein the maintaining the score includes adjusting the score associated with the one or more audio references based on at least one of a ranked list of popular recordings, a sales chart of popular songs, a sales chart of popular albums, a ranked list of most frequently played tracks on a radio station, or a ranked list of most frequently played tracks on a set of radio stations.

17. The method of claim 15, further comprising:
receiving a set of audio signal excerpts; and
matching one or more audio signal excerpts within the set of audio signal excerpts to the one or more audio references among the set of audio references based on the set of descriptors associated with the one or more audio references, wherein the score associated with the one or more audio references is adjusted based on the matching.

18. The method of claim 17, wherein the score associated with one or more audio references in the set of audio references is reset prior to matching the one or more audio signal excerpts within the set of audio signal excerpts.

19. The method of claim 17, wherein the set of audio signal excerpts are based on a set of audio signal queries.

20. The method of claim 17, wherein the set of audio signal queries are based on a period of time.

21. The method of claim 15, further comprising:
generating at least one interest point associated with at least one of the one or more audio references in the weighted reference index.

22. The method of claim 21, further comprising:
replacing interest points in a set of interest points in at least one descriptor among the set of descriptors associated with the one or more audio references in the weighted reference index with the at least one interest point.

23. The method of claim 21, further comprising:
generating at least one additional descriptor of the one or more audio references, wherein the at least one additional descriptor contains the at least one interest point.

24. The method of claim 23, wherein the adjusting the number of the one or more descriptors in the set of descriptors associated with the one or more audio references by associating the at least one additional descriptor of the one or more audio references with the one or more audio references.

25. The method of claim 15, further comprising weighting higher in a reference database popular queries over unpopular queries.

26. The method of claim 15, further comprising determining popular queries based at least in part on frequency of matched songs.

27. The method of claim 15, further comprising allocating space in the memory for respective queries based in part on popularity of respective queries.

28. A non-transitory computer-readable medium storing computer-executable instructions that, in response to execution, cause a device comprising a processor to perform operations, comprising:

maintaining an audio reference index containing a set of audio references, wherein one or more audio references in the set of audio references is associated with a set of descriptors;

maintaining a score associated with at least one of the one or more audio references in the set of audio references; and     generating a weighted reference index based on the set of audio references, wherein the set of descriptors is associated with the one or more audio references in the set of audio references, wherein the score is associated with the one or more audio references in the set of audio references, and wherein respective ones of the one or more audio references are up-weighted or down-weighted based at least in part on user popularity, and wherein the generating the weighted reference index is also performed by adjusting a number of the one or more descriptors in the set of descriptors associated with the one or more audio references in the weighted reference index based on the score associated with the respective ones of the one or more audio references, and allocate an amount of space in memory to store the one or more audio references based on the determination of the weighted reference index.

\* \* \* \* \*